US006346793B1

(12) United States Patent
Shibata et al.

(10) Patent No.: US 6,346,793 B1
(45) Date of Patent: Feb. 12, 2002

(54) BATTERY CHARGER WITH A TERMINAL PROTECTOR

(75) Inventors: Yoshinori Shibata, Anjo; Junichi Masuda, Okazaki, both of (JP)

(73) Assignee: Makita Corporation, Aichi-Ken (JP)

( * ) Notice: Subject to any disclaimer, the term of this patent is extended or adjusted under 35 U.S.C. 154(b) by 0 days.

(21) Appl. No.: 09/686,101

(22) Filed: Oct. 10, 2000

(30) Foreign Application Priority Data

Oct. 26, 1999 (JP) ............................. 11-304364

(51) Int. Cl.[7] .................................. H02J 7/00
(52) U.S. Cl. ...................... 320/113; 320/107; D13/107; 429/97
(58) Field of Search .................. 429/97, 100; 320/107, 320/110, 113, 114, 115; 213/103, 107, 108

(56) References Cited

U.S. PATENT DOCUMENTS

| 4,612,491 A | * | 9/1986 | McCarty et al. | ............. 320/107 |
| 5,280,229 A | * | 1/1994 | Faude et al. | ................. 320/110 |
| 5,457,376 A | * | 10/1995 | Chong et al. | ................ 320/107 |
| 5,523,666 A | * | 6/1996 | Hoelzl et al. | ................ 320/109 |
| 5,656,914 A | * | 8/1997 | Nagele et al. | ................ 320/110 |
| 5,856,038 A | * | 1/1999 | Mason | ........................ 429/97 |
| 5,910,380 A | * | 6/1999 | Taraboulos et al. | .......... 429/100 |
| D412,487 S | * | 8/1999 | Nagele et al. | ............. D13/108 |
| 5,939,858 A | * | 8/1999 | Dodd et al. | .................. 320/107 |
| 6,049,192 A | * | 4/2000 | Kfoury et al. | .............. 320/113 |
| D429,211 S | * | 8/2000 | Ohi et al. | ................... D13/107 |
| 6,127,802 A | * | 10/2000 | Lloyd et al. | ................. 320/113 |

OTHER PUBLICATIONS

HILTI TE6–A battery hammer drill Brochure (May, 1999).

* cited by examiner

Primary Examiner—Peter S. Wong
Assistant Examiner—Pia Tibbits
(74) Attorney, Agent, or Firm—Lahive & Cockfield, LLP

(57) ABSTRACT

A charger (1) includes a box enclosure (2), terminals (11, 12, 13), and a protective terminal cover (14) which in turn includes a top plate (15) extending at right angles to a pair of guide rails (6). The terminal cover (14) is pivotally supported by a pair of pivot pins (17) inside the box enclosure (2) such that the terminal cover (14) is pivotal between a protruding position, in which the top plate (15) is located directly above and protects the terminals and a retracted position, in which the terminal cover (14) is completely retracted inside the box enclosure (2). The terminal cover (14) is biased to the protruding position by a torsion spring (18) when a battery pack (40) is not set on the charger (1) for a recharge, whereas the terminal cover is manually moved to the retracted position against the biasing force of the torsion spring when the battery pack is slid on the charger into a set position.

19 Claims, 10 Drawing Sheets

BATTERY CHARGER WITH A TERMINAL PROTECTOR

This application claims priority on Japanese Patent Application No. 11-304364 filed on Oct. 26, 1999, the contents of which are incorporated herein by reference.

BACKGROUND OF THE INVENTION

1. Field of the Invention

The present invention relates to chargers for use with battery packs which are used to run electric power tools. More particularly, the present invention relates to a battery pack charger with a mechanism for protecting its terminals.

2. Description of the Related Art

One type of known battery charger is encased in a housing that includes a connecting portion, such as a pair of guide rails protruding from the housing's surface on which a battery pack is set for charging. A battery pack to be charged by such a charger typically includes a pair of slide rails on the battery pack's surface that is set on the charger during a charge. The slide rails can be engaged with and slid along the guide rails of the charger in order to set the pack in place on the charger. When the battery pack is attached to the charger by sliding of the pack's slide rails along the charger's guide rails, electrical contact is established between the charge terminals and data transmission terminals provided on the connecting portion of the charger and the corresponding terminals of the battery pack.

While this type of battery charger achieves its intended objective, it is not free from certain problems and inconveniences, thus leaving room for improvement. For example, as the terminals of this charger are exposed at the connecting portion to the external environment when the battery pack is not attached to the charger, the terminals may break or otherwise suffer damage caused by the charger dropping to the floor/that may result from the charger dropping to the floor or, conversely, by an object falling onto the charger.

Although it is possible to protect the charger terminals with a terminal cover or cap that can be detached or opened manually when no battery pack is set on the charger, users are likely to consider removing and placing (or opening and closing) the cover for each charge a tedious and inconvenient task. Another problem with this arrangement is the possibility of an user inadvertently leaving the terminals uncovered and, thus unprotected, upon completion of a charge, therefore exposing the terminals of the charger to various hazards, such as the those mentioned.

SUMMARY OF THE INVENTION

In view of the above-identified problems, an important object of the present invention is to provide a battery charger wherein protection of its the terminals is ensured without requiring the user to perform any additional action, such as manually removing and replacing a protective cover on the charge, when no battery pack is set on the charger.

The above objects and other related objects are realized by the invention, which provides a charger for charging a battery pack. The charger comprises: a housing including on an outside surface thereof a connecting portion to which a battery pack is removably attached; a plurality of charger terminals provided in the connecting portion for establishing electrical connection with the battery pack upon attachment of the battery pack to the connecting portion; and protective means provided in the connecting portion, with the protective means being adapted to cover the charger terminals when the battery pack is not attached to the connecting portion and to be actuated by a motion of attaching the battery pack to the connecting portion to expose the charger terminals when the battery pack is attached to the connecting portion.

When the battery pack is not set on the charger, the protective means ensures protection of the terminals of the charger from falling objects or from damage to the terminals caused by the charger falling to the floor or the ground. Further, the protective means is actuated by attachment of the battery pack to the charger to expose the charger's terminals, and the protective means is adapted to automatically return to the protruding position upon removal of the battery pack from the charger. This ensures protection of the terminals without requiring additional action by the user whenever the battery pack is removed from the charger. Unlike with a detachable protective means, such as a detachable cover, there is no possibility of inadvertently leaving the charger terminals uncovered upon completion of a charge.

According to one aspect of the present invention, the protective means comprises a rotatable cover adapted to rotate between a protruding position, which is attained when the battery pack is not attached to the connecting portion, in which at least a portion of the cover protrudes from the housing and the connection portion so as to at least partially cover the charger terminals, and a retracted position, which is attained when the battery pack is attached to the connecting portion, in which the cover is at least partially retracted inside the housing. The rotatable cover provides suitable protective means for use with a structure in which a battery pack is slid on the charger into attachment therewith.

According to another aspect of the present invention, the charger further comprises guide means provided in the connecting portion for allowing the battery pack to be slid along a predetermined guide locus into attachment to the connecting portion and biasing means for urging the protective cover to the protruding position when the battery pack is not attached to the connecting portion. In this structure, the battery pack is brought into contact with and rotate the protective cover to the retracted position against the biasing force of the biasing means when the pack is slid along the guide locus.

According to another aspect of the present invention, the guide locus has a front end at which a front portion of the battery pack is placed on the charger prior to sliding of the charger into attachment with the connecting portion and a rear end to which the battery pack is slid into attachment with the connecting portion, and the protective cover is pivotally disposed between the front and rear ends of the guide locus so as to pivot toward the rear end to the retracted position when the battery pack is slid to the rear end of the guide locus.

According to still another aspect of the present invention, the protective cover includes a transverse top plate extending substantially orthogonal to the guide locus, a pair of vertical side plates connected to the top plate, and a pair of pivots for supporting the side plates inside the housing so as to allow the protective cover to pivot along the guide locus between said two positions, the top plate being located outside the housing directly above the charger terminals to protectively cover the charger terminals when the battery pack is not attached to the connecting portion.

According to still another aspect of the present invention, the charger further includes a transverse slit formed in the connecting portion for allowing the top plate to pivot between the two positions and a pair of side slits provided in the connecting portion for allowing the side plates to pivot between the two positions.

According to yet another aspect of the present invention, the top plate has a curved cross section on a plane parallel to the guide locus, with the curvature of the section substantially coinciding with the locus of the pivoting motion of the top plate. In addition, the transverse slit is at least partially defined by at least one wall surface of the housing having a curvature substantially concentric with said locus of the pivoting motion.

According to one feature of the present invention, the guide means and the guide locus are slanted such that the rear end of the guide locus is located at a lower level than the front end, facilitating sliding and thus attachment of the battery pack to the connecting portion.

According to another feature of the present invention, the guide means includes a pair of guide rails for slidably engaging the battery pack, whereas the biasing means includes a coil spring fitted on one of the side plates.

In one embodiment, the protective means includes a pair of rotatable covers, with the charger further including guide means provided in the connecting portion for allowing the battery pack to slide along a guide locus into attachment to the connecting portion. The charger further includes biasing means for urging the rotatable covers to respective protruding positions, which are attained when the battery pack is not attached to the connecting portion, in which at least a portion of each rotatable cover protrudes out of the housing and the connection portion so as to cover the charger terminals. Additionally included in the charger is a button located in the guide locus and depressed by the battery pack when the pack is placed on the connecting portion prior to sliding of the battery pack on the charger into attachment to the connecting portion. When depressed by the battery pack, the button actuates the rotatable covers to rotate against the biasing force of the biasing means from the respective protruding positions to respective retracted positions, in which the covers are retracted inside the housing so as to expose the charger terminals. Provision of two protective, rotatable covers provide even greater protection for the terminals than a single cover does.

According to still another feature of the present invention, the guide locus has a front end at which a front portion of the battery pack is placed on the charger prior to sliding of the charger into attachment with the connecting portion and a rear end to which the battery pack is slid into attachment with the connecting portion. Moreover, the rotatable covers are pivotally disposed between the front and rear ends of the guide locus and the button is located between the front end and the rotatable covers.

According to yet another feature of the present invention, the button extends through the connecting portion and is adapted to be depressed by the weight of the battery pack to actuate the rotatable covers to rotate to the respective retracted positions when the pack is placed on the button.

In accordance with one aspect of the present invention, the rotatable covers are pivotally supported inside the housing by a common pivot extending parallel to the guide locus and are substantially symmetrical about a plane passing through the common pivot so as to pivot away from each other in directions orthogonal to the guide locus when the button is depressed, and wherein opposing continuous edges of the covers abut each other on said plane passing through the common pivot when the two covers are in the respective protruding positions so as to completely cover the charger terminals outside the housing.

In accordance with another aspect of the present invention, each cover includes a curved top plate having an identical arc-shaped cross section on a plane orthogonal to the guide locus and a pair of vertical side plates connected to the top plate such that when the covers abut each other in the protruding positions, said cross sections of the top plates form a continuous arc.

In still another aspect, the biasing means includes a coil spring fitted on the rotatable covers, whereas the guide means includes a pair of guide rails for slidably engaging the battery pack.

In yet another aspect, the housing includes a plurality of slits provided therein to permit the covers to rotate between the respective protruding positions and the respective retracted positions.

Other general and more specific objects of the invention will in part be obvious and will in part be evident from the drawings and descriptions which follow.

BRIEF DESCRIPTION OF THE ATTACHED DRAWINGS

For a fuller understanding of the nature and objects of the present invention, reference should be made to the following detailed description and the accompanying drawings, in which.

DETAILED DESCRIPTION OF THE PREFERRED EMBODIMENTS

Preferred embodiments according to the present invention will be described hereinafter with reference to the attached drawings.

Embodiment 1

Figure 1:
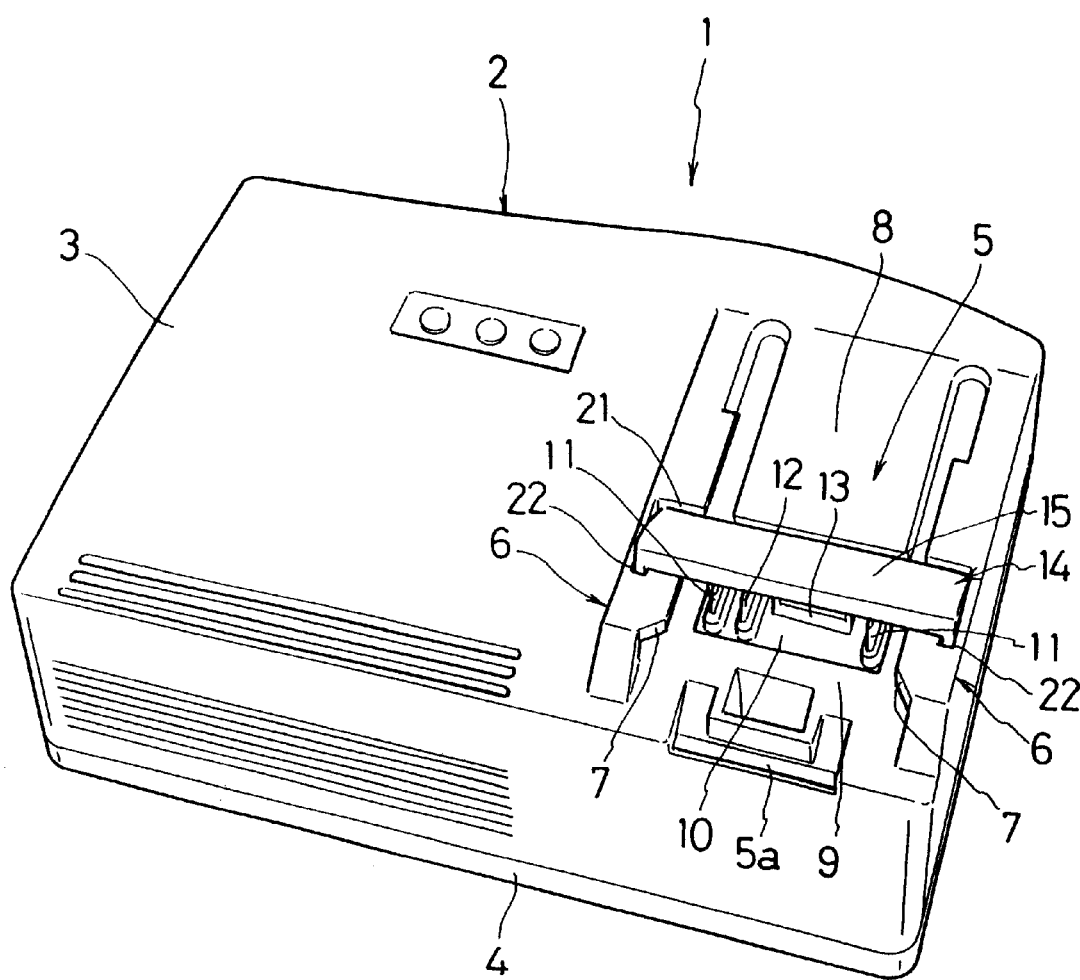
FIG. 1 is a perspective view of a battery pack charger having a protective terminal cover according to a preferred embodiment of the present invention.
Figure 5:
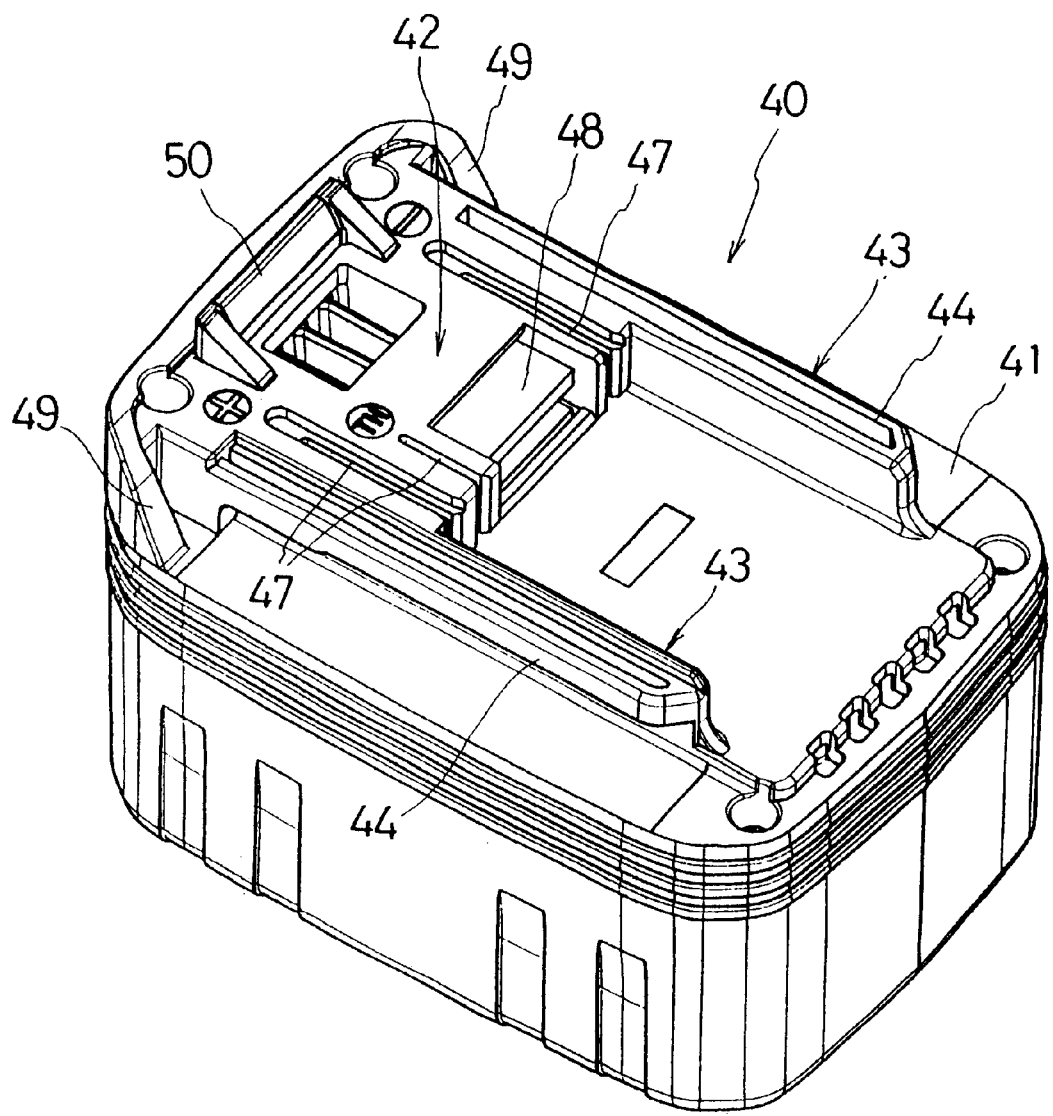
FIG. 5 is a perspective view of a battery pack to be set on the charger of FIG. 1.
Figure 6:
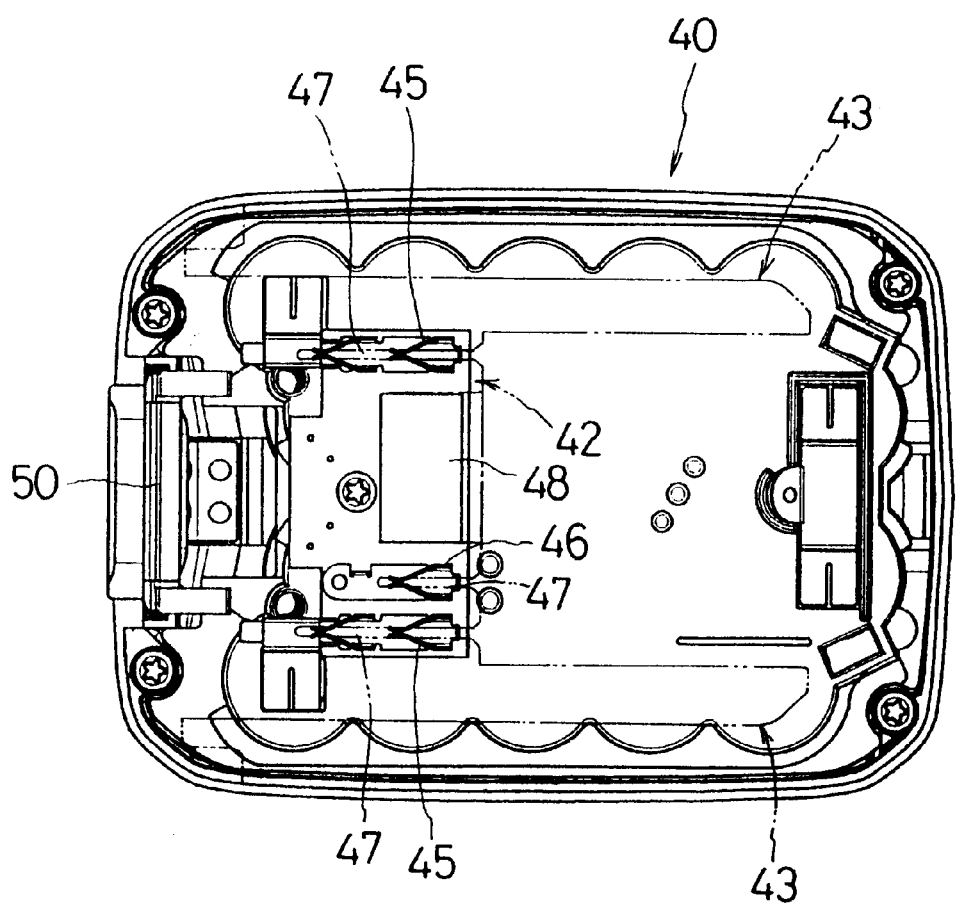
FIG. 6 is a plan view of the battery pack of FIG. 5, showing the positions of terminals provided on the battery pack.

FIG. 1 is a perspective view of a battery pack charger 1 in accordance with the present invention. The charger 1 includes an upper case 3 and a base 4 that forms a box enclosure 2 encasing a circuit board (not shown). A connecting portion 5 is provided on the enclosure's upper surface to which a battery pack 40 is attached as shown in FIGS. 5 and 6. The battery pack 40 includes an outer case 41 which contains a plurality of cells. Provided on the top surface of the battery pack 40 are a connecting portion 42 thereof and a pair of parallel slide rails extending in a forward direction (in the direction opposite to the end of the pack's top surface where the connecting portion 42 is located) on both sides of the connecting portion 42. Each slide rail 43 includes an outwardly extending flange 44 along the entire length of the rail, thus forming an L-shaped cross section on a plane which extends orthogonal to the aforementioned forward direction. Provided between the pair of parallel slide rails 43 are a pair of charge and discharge terminals 45, a temperature detection terminal 46, and three slits 47 that partially expose the terminals 45 and 46 for connection to the charger 1. The battery pack 40 further includes a data transmission connector terminal 48 and a pair of stoppers 49 formed on both sides of the connecting portion 42 at the rear of the battery pack 40.

Figure 2:
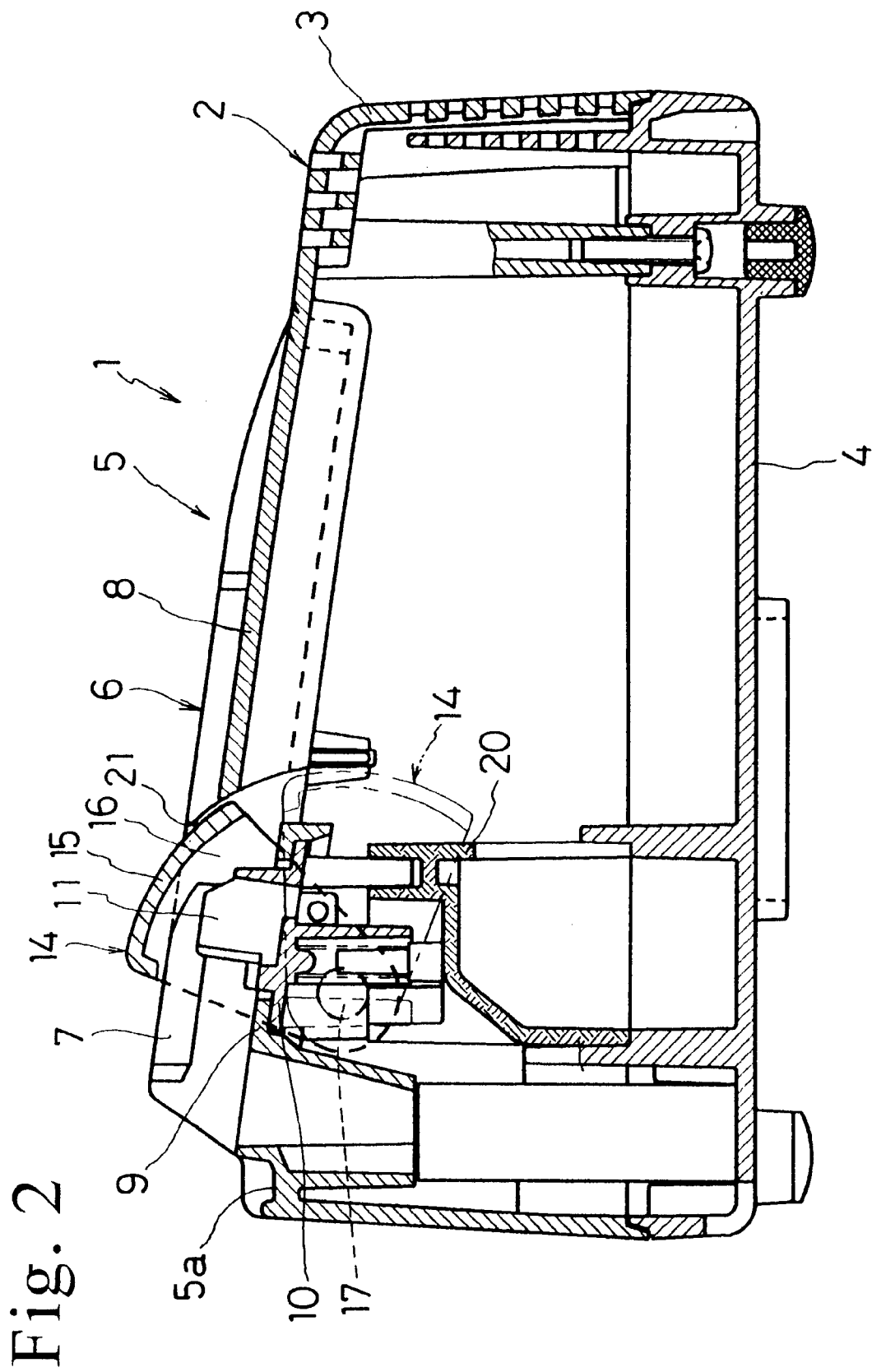
FIG. 2 is a cross-sectional view of the charger of FIG. 1 taken on a longitudinal line.
Figure 3:
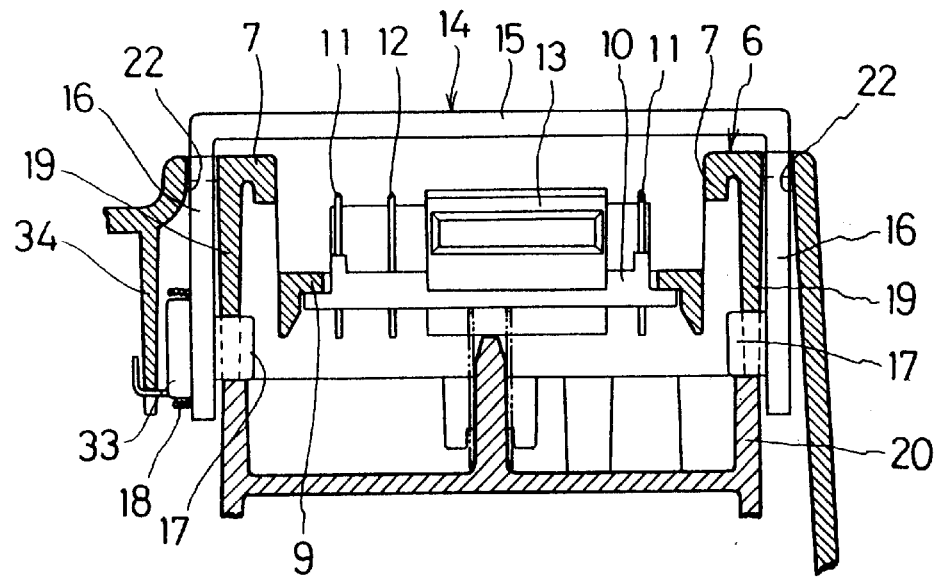
FIG. 3 is a cross-sectional view of the charger of FIG. 1 taken on a traverse line, showing the structure for pivotally supporting the terminal cover.
Figure 7:
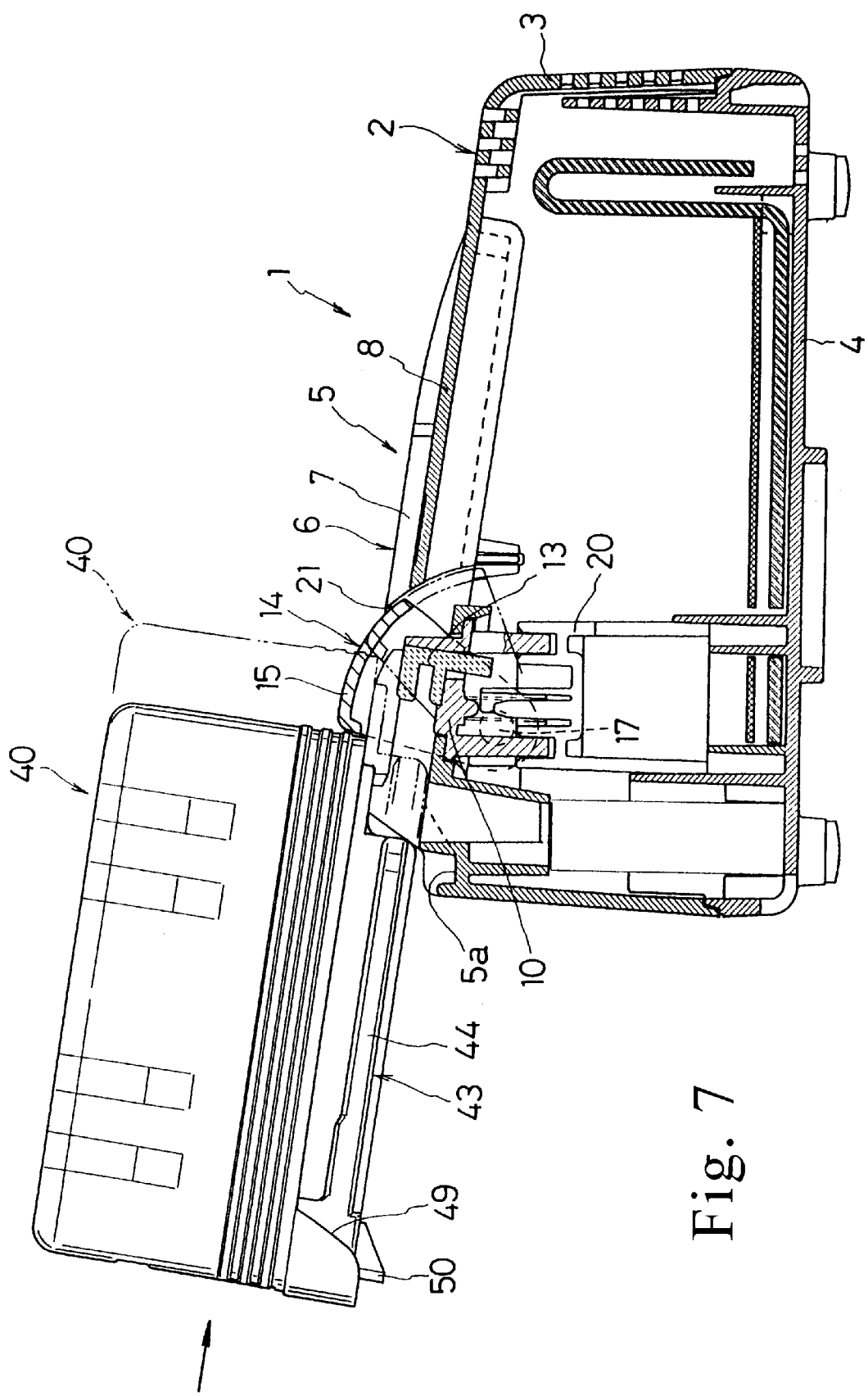
FIG. 7 is a side elevation showing the battery pack of FIG. 5 placed on the charger of FIG. 1 prior to manual slide into attachment with the charger.
Figure 8:
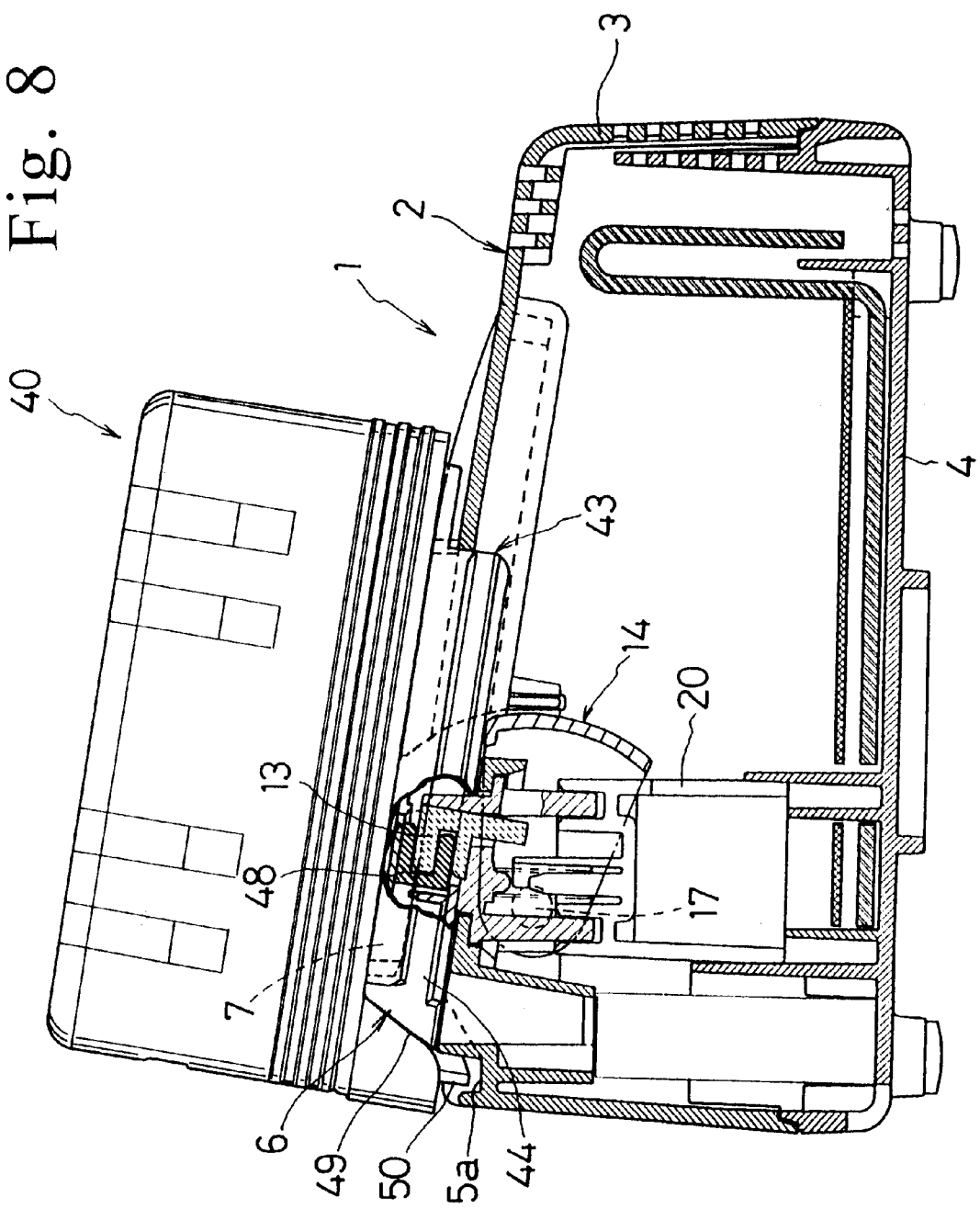
FIG. 8 is a side elevation showing the battery pack of FIG. 5 set in place on the charger for a charge.

With reference to FIGS. 1 to 3, the connecting portion 5 of the charger 1 includes a pair of parallel guide rails 6 which are spaced apart by a distance greater than the distance between the outermost edges of the flanges 44 of the slide rails 43. In addition, as best shown in FIG. 3, an extension 7 projects a short distance inward from the top surface of each guide rail 6 before extending downward. As shown in FIGS. 7 and 8, to set the battery pack 40 on the charger 1, the slide rails 43 of the inverted pack 40 are first inserted between the guide rails 6 at the rear of the charger 1 (the left end of the charger as seen in FIGS. 2, 7, and 8 will be hereafter referred to as its rear), so that the guide rails 6 can hold the slide rails 43 therebetween. The battery pack 40 is then moved forward with the slide rails 43 sliding along the guide rails 6 until the stoppers 49 of the battery pack 40 come into abutment with the rear ends of the guide rails 46.

Referring again to FIGS. 1 and 2, the connecting portion 5 of the charger 1 includes a front portion 8 and a rear portion 9 which is generally located at a lower plane than the front portion 8 so as to form a transverse step therebetween that spans the guide rails 6. The front portion 8 provides a flat surface which is abutted by the battery pack's top surface between the slide rails 43 when the battery pack 40 is set on the charger 1. As also shown in FIG. 3, a terminal block 10 is mounted on the rear portion 9 of the charger 1. The terminal block 10 includes a pair of charge terminals 11, a temperature detection terminal 12, and a data transmission connector terminal 13, with all the terminals oriented parallel toward the rear of the charger 1.

As best shown in FIG. 2, the entire connecting portion 5 is sloped generally downward to the front end thereof so that the weight of the battery pack 40 facilitates the battery pack's sliding motion and stabilizes the battery pack 40 when it is set in place.

Figure 4:
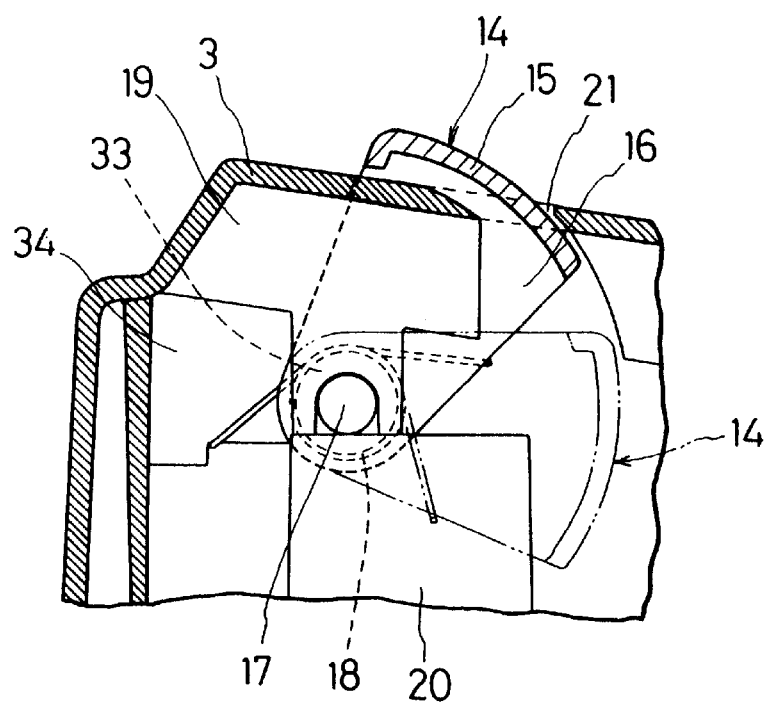
FIG. 4 is a partial cross-sectional view of the charger of FIG. 1 taken on a longitudinal line, showing the structure for pivotally supporting the terminal cover from a different perspective.

Still referring to FIGS. 1 and 2, additionally provided in the connecting portion 5 is a protective terminal cover 14 that extends generally over the aforementioned step separating the front and rear portions 8 and 9 at right angles to the guide rails 6. The terminal cover 14 includes a rectangular top plate 15 having a curved cross section taken along a line parallel to the guide rails 6 (curved in the direction of its width). The terminal cover 14 further includes a pair of side plates 16 vertically extending downward from side ends of the top plate 15. In addition, a pair of pins 17 projects inward from the lower ends of the side plates 16. As also shown in FIG. 4, the pins 17 of the terminal cover 14 are rotatably held between respective support plates 19 extending downward from the inner surface of the upper case 3 and a terminal base 20 that supports the terminal block 10 such that the terminal cover 14 is pivotal between a protruding position (shown in solid lines in FIGS. 1 to 4) and a retracted position (shown in two-dot chain lines in FIGS. 2 and 4) through a traverse slit 21 and a pair of side slits 22. The slits 21 and 22 are formed between the front portion 8 and the rear portion 9, with the side slits 22 provided at the two ends of the traverse slit 21 in parallel with the guide rails 6 so as to permit pivoting of the side plates 16 on the pins 17. In the protruding position, the side plates 16 of the terminal cover 14 abuts the rear ends of the respective slits 22 with the top plate 15 located directly above and protectively covering the terminal block 10. In the retracted position, the terminal cover 14 is completely retracted inside the box enclosure 2. It should be noted that when no battery pack is set on the charger 1, the terminal cover 14 is urged to the protruding position by the biasing force of a torsion spring 18 disposed between a protrusion 33 on the outside surface of one of the side plates 16 and a rib 34 on the upper case 3.

When the battery pack 40 is not set on the charger 1, the terminal cover 14 of the charger 1 is located over the terminal block 10 in the protruding position as described above. When the battery pack 40 is charged by the charger 1, the battery pack is first inverted with the connecting portion 42 facing downward. The slide rails 43 of the battery pack 40 are then placed between the guide rails 6 of the charger's connecting portion 5. As shown in the two-dot chain lines in FIG. 7, when slid forward, the battery pack 40 abuts against and rotates the terminal cover 14 of the charger 1 forward against the biasing force of the torsion spring 18. In this way, the terminal cover 14 is retracted into the box enclosure 2 without obstructing the forward slide of the battery pack 40. As shown in FIG. 8, when the battery pack 40 is slid into place with its stoppers 49 abutting the rear ends of the guide rails 6 of the charger 1, the terminal cover 14 is in the retracted position while the charge terminals 11, the temperature detection terminal 12, and the data transmission connector terminal 13 of the charger 1 are connected with the charge and discharge terminals 45, the temperature detection terminal 46, and the data transmission connector terminal 48, respectively, of the battery pack 40. Furthermore, as best shown in FIG. 5, a click plate 50 is mounted at the rear of the battery pack 40 so as to be urged to the illustrated position by a biasing means (not shown). Referring again to FIG. 8, when the battery pack 40 is set in place on the charger 1, the click plate 50 fits into a recess 5a at the rear edge of the connecting portion 5 with a sensible click.

When the battery pack 40 is removed from the connecting portion 5 of the charger 1 upon completion of a charge, the pack 40 is slid rearward from the position of FIG. 8, allowing the biasing force of the torsion spring 19 to rotate the terminal cover 14 rearward. As the battery pack 40 continues to be slid rearward, the terminal cover 14 comes out of the box enclosure 2 until it returns to the protruding position over the terminal block 10 when the battery pack is removed.

According to the foregoing embodiment, when the battery pack 40 is not set on the charger 1, the terminal cover 14 ensures protection of the terminals of the terminal block 10 from objects falling onto the block 10 or from damage to the block 10 caused by the charger falling to the floor or the ground. Further, as described above, the terminal cover 14 is abutted and retracted inside the box enclosure 2 by the forward slide of the battery pack 40 during its attachment to the charger 1, and the cover 14 automatically returns to the protruding position upon removal of the battery pack from the charger 1. This ensures protection of the terminal block 10 without requiring additional action from the user whenever the battery pack is removed from the charger 1. Unlike a detachable cover, there is no possibility of inadvertently leaving the charger's terminals uncovered upon completion of a charge. Therefore, the first embodiment provides an improved terminal protective cover for a battery pack to which a battery charger is attached by slide motion, such as shown above.

Embodiment 2

An alternative embodiment of a protective cover is described hereinafter with reference to the attached drawings, in which identical or similar reference numerals or characters denote identical or similar parts or elements throughout the several views. Therefore, description of such elements as well as description of common structures is omitted.

Figure 9:
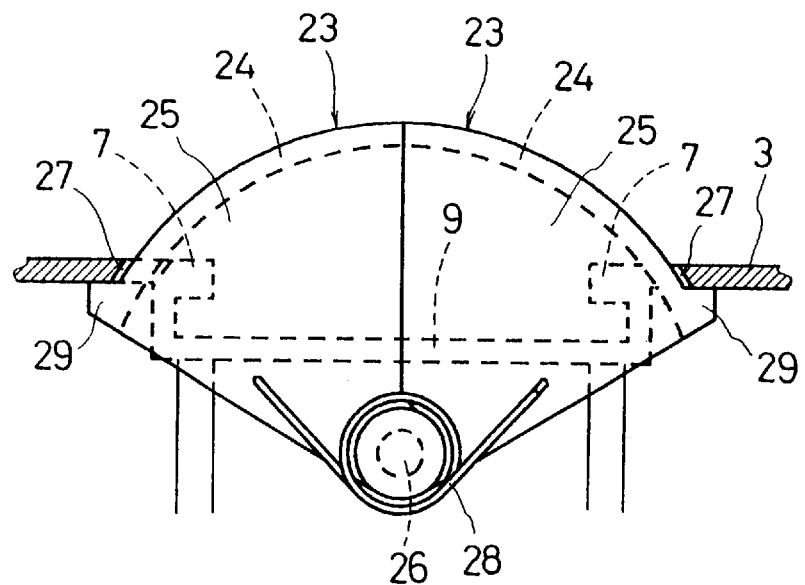
FIG. 9 is a front elevation of terminal covers of a charger according to a second embodiment of the invention.
Figure 10:
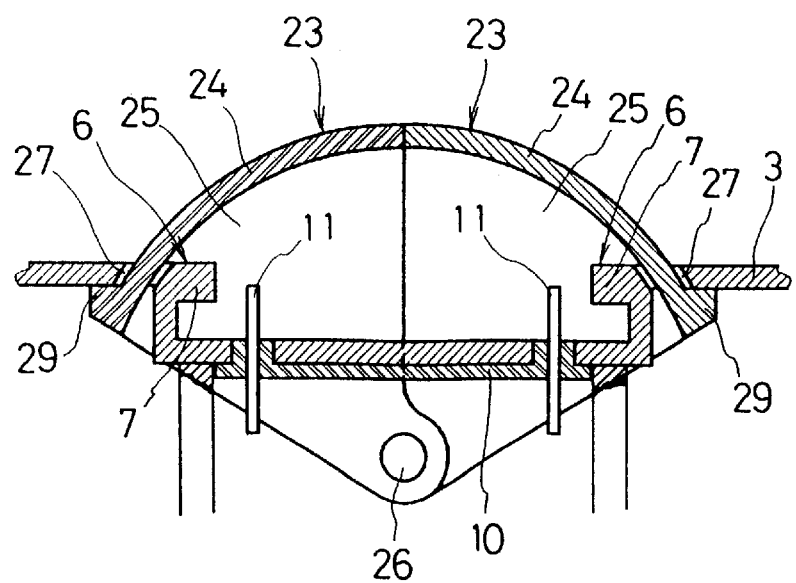
FIG. 10 is a cross-sectional view of the terminal covers shown in FIG. 9.
Figure 11A:
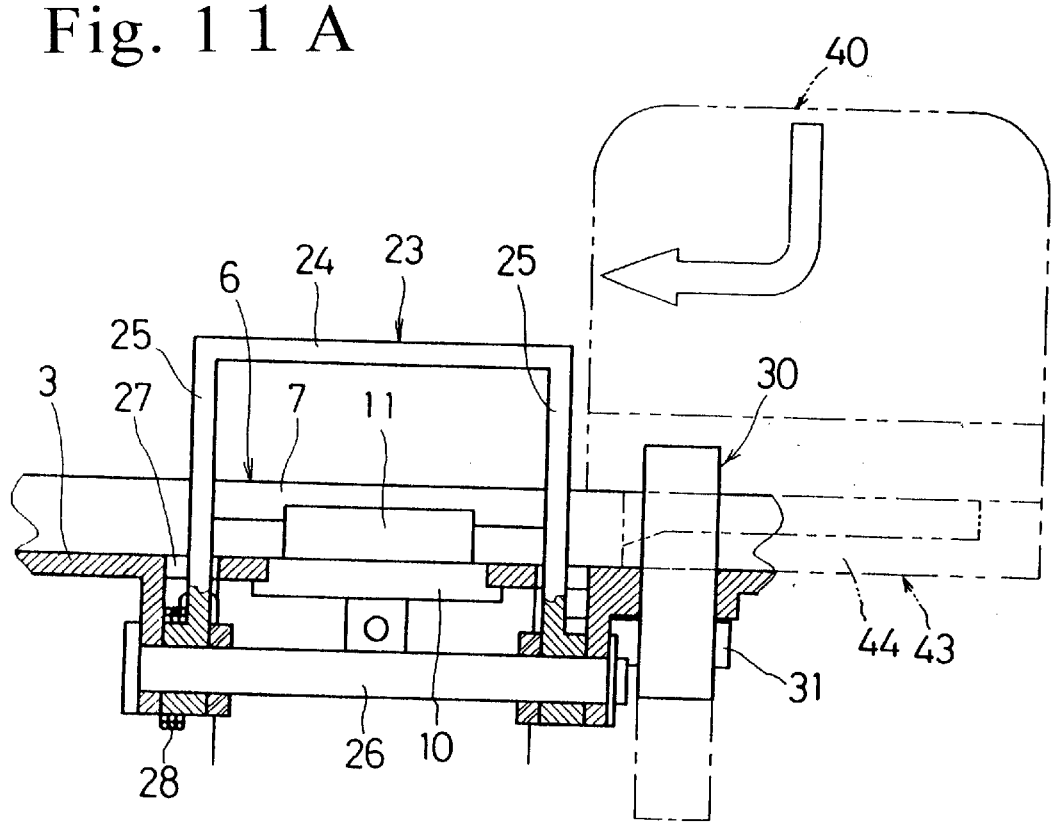
FIG. 11A is a partially cross-sectional side view of a connecting portion, which includes the terminal covers shown in FIG. 9.
Figure 11B:
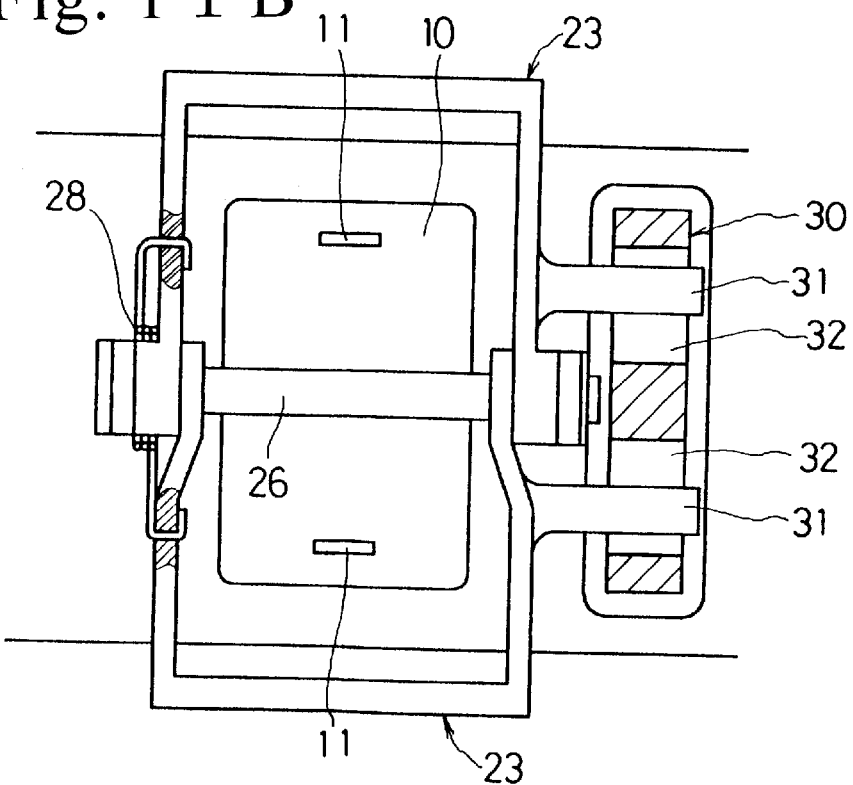
FIG. 11B is a bottom view of the connecting portion shown in FIG.1 11A.

As shown in FIGS. 9 to 11, in this embodiment, a pair of terminal covers 23 is provided in lieu of the single terminal cover 14 of the first embodiment such that the top plate 24 of each of the covers 23 is oriented parallel to the guide rails 6. Each terminal cover 23 is similar to the terminal cover 14 of the first embodiment in that its top plate 24 also has a curved cross section taken along a line parallel to the guide rails 6 (curved in the direction of its width) and includes a pair of side plates 25 vertically extending downward from opposing ends of the top plate 24. The side plates 25 of the terminal covers 23 are supported by a pin 26 inside the box enclosure 2 so as to pivot on the pin 26 along the same circular path of movement through a pair of slits 27 in the upper case 3 outside of the guide rails 6. This allows the terminal covers 23 to pivot orthogonally to the guide rails 6, completely covering the space over the terminal block 10 when they are pivoted or rotated to a protruding position (described in further detail below). As shown in FIGS. 11A and 11B, a torsion spring 28 is fitted on the boss formed on one of front side plates 25 (the term "front" as used herein refers to the left of FIGS. 11A and 11B in this embodiment) with two ends of the spring 28 inserted through the two front side plates 25 so as to urge the two terminal covers 23 to the protruding position, where the covers 23 abut each other directly above the terminal block 10. Each terminal cover 23 includes a stopper protrusion 29 (see FIGS. 9 and 10) provided on an outer edge thereof for abutting the underside of the upper case 3 when the cover 23 is in the protruding position so as to prevent further pivot of the cover 23.

Referring to FIGS. 11A and 11B and 12A and 12B, the charger 1 further includes a generally rectangular-shaped open-and-close button 30 behind the terminal covers 23 where the battery pack 40 is placed on and slid into attachment with the charger, as indicated by the thick arrow in FIG. 11A. The open-and-close button 30 has a pair of horizontal slots 32 therein loosely penetrated by a pair of support pins 31 projecting at the same horizontal level from the rear side plates 25 such that the button 30 projects from the top surface of the upper case 3 when the terminal covers 23 are in the protruding position and is held horizontal regardless of the position of the terminal covers 23. It should be noted that each horizontal slot 32 is sized and dimensioned to permit circular movement of the inserted support pin 31 therein during actuation of the button 30.

Figure 12A:
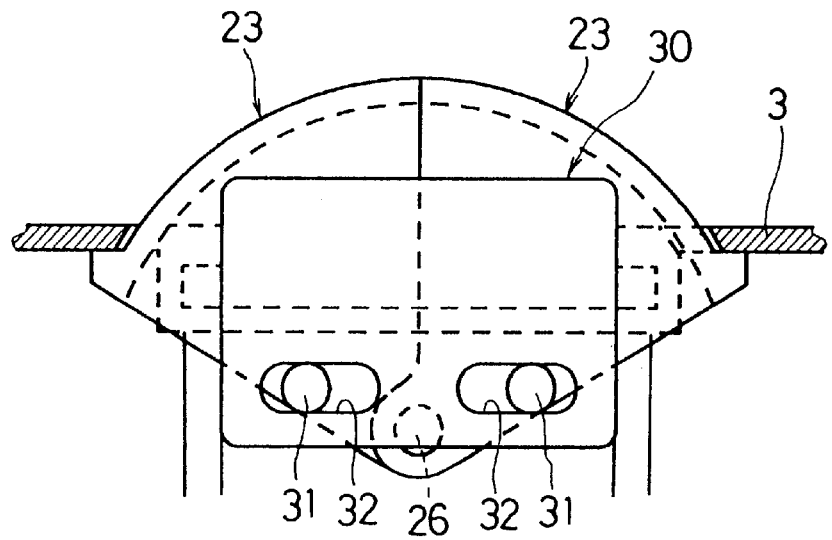
FIG. 12A is a partially cross-sectional rear view of the connecting portion shown in FIG. 11A.
Figure 12B:
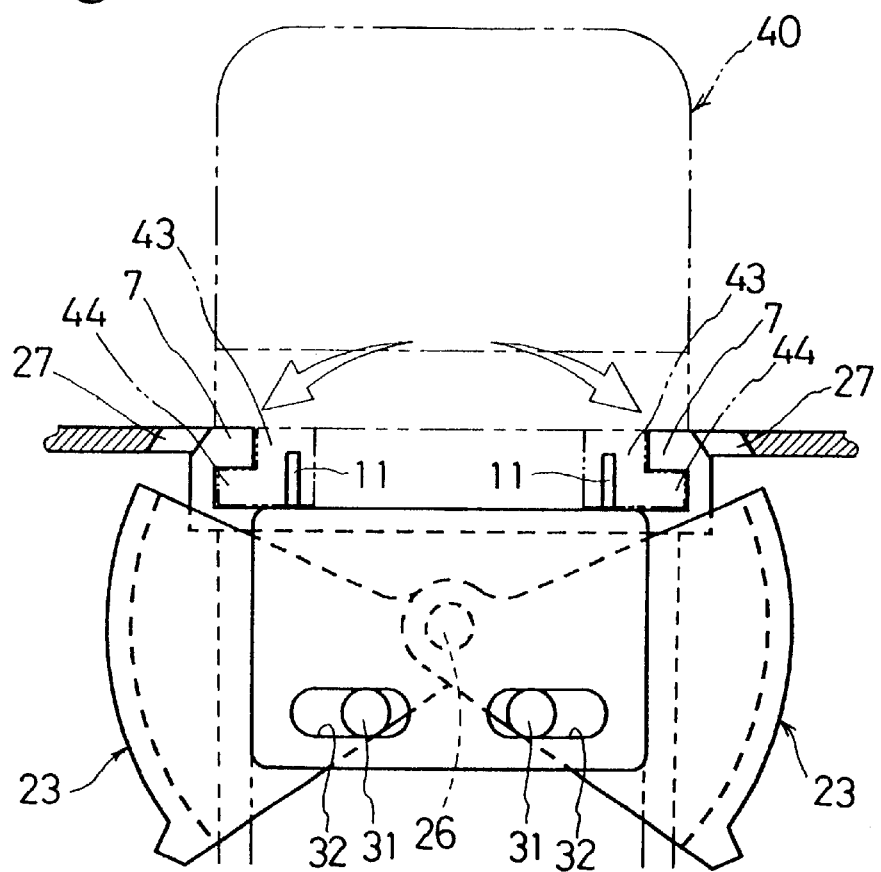
FIG. 12B shows how the terminal covers of FIG. 9 are opened sideways to expose the charger's terminals when the battery pack is attached to the charger.

According to the second embodiment, when the battery pack 40 is not set on the connecting portion 5 of the charger 1, the terminal block 10 is protectively covered by the terminal covers 23 in the protruding position, as described above. As indicated by the thick arrow in FIG. 11A, when the battery pack 40 is placed on the open-and-close button 30 prior to slide thereof for a charge, the weight of the battery pack 40 depresses the button 30 downward. With the downward movement of the open-and-close button 30, the support pins 31 are also moved downward, thus pulling down the terminal covers 23 via the horizontal slots 32. This rotates each terminal cover 23 on the pin 26 away from the other to the retracted position as shown in FIG. 12B, thus exposing the terminals 11. Subsequently, when the slide rails 43 of the battery pack 40 are slid forward between the guide rails 6 of the charger 1, the battery pack 40 is set on the connecting portion 5, with electrical connection established between the terminals of the pack and those of the charger, as in the first embodiment. As the open-and-close button 30 continues to be depressed by the battery pack 40 during the slide of the pack, the terminal covers 23 remain in the retracting position without protruding above the top surface of the upper case 3.

As soon as the battery pack 40 is slid rearward and removed from the connecting portion 5 and the open-and-close button 30 upon completion of a recharge, the biasing force of the torsion spring 28 urges the terminal covers 23 to rotate to the protruding position, in which the terminal block 10 is covered, while bringing the open-and-close button 30 to its upper position.

According to the second embodiment, when the battery pack 40 is not set on the charger 1, the terminal covers 23 ensures protection of the terminals of the charger 1 from objects falling onto the block 10 or from damage to the block 10 caused by the charger falling to the floor or the ground. In addition, the motion of setting the battery pack on the charger causes the terminal covers 23 to retract into the box enclosure 2, whereas the covers 23 automatically return to the protruding position upon removal of the battery pack. This ensures protection of the terminal block 10 without requiring additional action from the user whenever the battery pack 40 is removed from the charger 1. Unlike a detachable cover, there is no possibility of inadvertently leaving the charger's terminals uncovered upon completion of a charge. Advantageously, the structure of this embodiment can completely cover the charger's terminals while the charger is not in use. Therefore, even greater protection is provided for the terminals than by the first embodiment, although a slightly more complicated structure is required for this purpose.

Those with ordinary skill in the art will understand that the structure for opening and closing the cover or covers need not be limited to those of the foregoing two embodiments. For example, a slanted flat plate may be disposed forward of the terminals of the charger so as to extend over the terminals at an angle to the terminal block 10. Such a flat plate may be additionally provided with appropriate biasing means, such as a coil spring, in order to bias the plate to a forward position and cover the terminals when the charger is not in use, such that the flat plate can be slid rearward by manual slide of the battery pack when the pack is set on the charger for a recharge. As an alternative structure, a flat plate may be supported on one side of the terminal block 10 in such a manner as to allow the plate to rotate horizontally above the terminals. Similar effects can be obtained by providing a torsion spring for maintaining the flat plate in a position to cover the terminals so that the plate can be rotated by sliding of the battery pack on the charger to clear the space above the terminals.

According to the second embodiment, the open-and-close button 30 is positioned such that it is depressed when the battery pack 40 is placed on the charger 1 before slid into attachment. Similar effects can be achieved, for example, by replacing this button 30 with a different type of button having a sloping surface that faces the battery pack when it is placed on the charger and is located in the battery pack's slide path or locus. Other modifications and/or changes are possible within the scope of the invention.

Equivalents

It will thus be seen that the present invention efficiently attains the objects set forth above, among those made apparent from the preceding description. As other elements may be modified, altered, and changed without departing from the scope or spirit of the essential characteristics of the present invention, it is to be understood that the above embodiments are only an illustration and not restrictive in any sense. The scope or spirit of the present invention is limited only by the terms of the appended claims.

Having described the invention, what is claimed as new and desired to be secured by Letters Patent is:

1. A charger for charging a battery pack, comprising:
   a housing including on an outside surface thereof a connecting portion to which a battery pack is removably attached;
   a plurality of charger terminals provided in the connecting portion for establishing electrical connection with the battery pack upon attachment of the battery pack to the connecting portion; and
   protective means provided in the connecting portion, the protective means being adapted to cover the charger terminals when the battery pack is not attached to the connecting portion and to be actuated by a motion of attaching the battery pack to the connecting portion to expose the charger terminals when the battery pack is attached to the connecting portion.

2. A charger in accordance with claim 1, wherein the protective means comprises a rotatable cover adapted to rotate between a protruding position, which is attained when the battery pack is not attached to the connecting portion, in which at least a portion of the cover protrudes from the housing and the connection portion so as to at least partially cover the charger terminals, and a retracted position, which is attained when the battery pack is attached to the connecting portion, in which the cover is at least partially retracted inside the housing.

3. A charger in accordance with claim 2 further comprising
   guide means provided in the connecting portion for allowing the battery pack to be slid along a predetermined guide locus into attachment to the connecting portion, and
   biasing means for urging the protective cover to the protruding position when the battery pack is not attached to the connecting portion,
   wherein the battery pack is brought into contact with and rotate the protective cover to the retracted position against the biasing force of the biasing means when the pack is slid along the guide locus.

4. A charger in accordance with claim 3, wherein the guide locus has a front end at which a front portion of the battery pack is placed on the charger prior to sliding of the charger into attachment with the connecting portion and a rear end to which the battery pack is slid into attachment with the connecting portion, and
   wherein the protective cover is pivotally disposed between the front and rear ends of the guide locus so as to pivot toward the rear end to the retracted position when the battery pack is slid to the rear end of the guide locus.

5. A charger in accordance with claim 3, wherein the guide means and the guide locus are slanted such that the rear end of the guide locus is located at a lower level than the front end, facilitating sliding and thus attachment of the battery pack to the connecting portion.

6. A charger in accordance with claim 4, wherein the protective cover includes a transverse top plate extending substantially orthogonal to the guide locus, a pair of vertical side plates connected to the top plate, and a pair of pivots for supporting the side plates inside the housing so as to allow the protective cover to pivot along the guide locus between said two positions, the top plate being located outside the housing directly above the charger terminals to protectively cover the charger terminals when the battery pack is not attached to the connecting portion.

7. A charger in accordance with claim 6 further comprising a transverse slit formed in the connecting portion for allowing the top plate to pivot between the two positions and a pair of side slits provided in the connecting portion for allowing the side plates to pivot between the two positions.

8. A charger in accordance with claim 6, wherein the top plate has a curved cross section on a plane parallel to the guide locus, the curvature substantially coinciding with the locus of the pivoting motion of the top plate, and wherein the transverse slit is at least partially defined by at least one wall surface of the housing having a curvature substantially concentric with said locus of the pivoting motion.

9. A charger in accordance with claim 6, wherein the guide means includes a pair of guide rails for slidably engaging the battery pack, and wherein the biasing means includes a coil spring fitted on one of the side plates.

10. A charger in accordance with claim 1, wherein the protective means includes a pair of rotatable covers, the charger further comprising
    guide means provided in the connecting portion for allowing the battery pack to slide along a guide locus into attachment to the connecting portion,
    biasing means for urging the rotatable covers to respective protruding positions, which are attained when the battery pack is not attached to the connecting portion, in which at least a portion of each rotatable cover protrudes out of the housing and the connection portion so as to cover the charger terminals, and
    a button located in the guide locus and depressed by the battery pack when the pack is placed on the connecting portion prior to sliding of the battery pack on the charger into attachment to the connecting portion, wherein when depressed by the battery pack, the button is adapted to actuate the rotatable covers to rotate against the biasing force of the biasing means from the respective protruding positions to respective retracted positions, in which the covers are retracted inside the housing so as to expose the charger terminals.

11. A charger in accordance with claim 10, wherein the guide locus has a front end at which a front portion of the battery pack is placed on the charger prior to sliding of the charger into attachment with the connecting portion and a rear end to which the battery pack is slid into attachment with the connecting portion, and wherein the rotatable covers are pivotally disposed between the front and rear ends of the guide locus and the button is located between the front end and the rotatable covers.

12. A charger in accordance with claim 11, wherein the rotatable covers are pivotally supported inside the housing by a common pivot extending parallel to the guide locus and are substantially symmetrical about a plane passing through the common pivot so as to pivot away from each other in directions orthogonal to the guide locus when the button is depressed, and wherein opposing continuous edges of the covers abut each other on said plane passing through the common pivot when the two covers are in the respective protruding positions so as to completely cover the charger terminals outside the housing.

13. A charger in accordance with claim 11, wherein the housing includes a plurality of slits provided therein to permit the covers to rotate between the respective protruding positions and the respective retracted positions.

14. A charger in accordance with claim 11, wherein the guide locus and the guide means are slanted such that the rear end is located at a lower level than the front end, thus facilitating sliding and attachment of the battery pack to the charger.

15. A charger in accordance with claim 12, wherein the biasing means includes a coil spring fitted on the rotatable covers, and wherein the guide means includes a pair of guide rails for slidably engaging the battery pack.

16. A charger in accordance with claim 10, wherein the button extends through the connecting portion and is adapted to be depressed by the weight of the battery pack to actuate the rotatable covers to rotate to the respective retracted positions when the pack is placed on the button.

17. A charger in accordance with claim 10, wherein each cover includes a curved top plate having an identical arc-shaped cross section on a plane orthogonal to the guide locus and a pair of vertical side plates connected to the top plate such that when the covers abut each other in the protruding positions, said cross sections of the top plates form a continuous arc.

18. A charger for charging a battery pack, comprising:
a housing including on an outside surface thereof a connecting portion to which a battery pack is removably attached;
a plurality of charger terminals provided in the connecting portion for establishing electrical connection with the battery pack upon attachment of the battery pack to the connecting portion;
protective means comprising a rotatable cover provided in the connecting portion, the protective means being adapted to cover the charger terminals when the battery pack is not attached to the connecting portion and to be actuated by a motion of attaching the battery pack to the connecting portion to expose the charger terminals when the battery pack is attached to the connecting portion, wherein the rotatable cover is adapted to rotate between a protruding position, which is attained when the battery pack is not attached to the connecting portion, in which at least a portion of the cover protrudes from the housing and the connection portion so as to at least partially cover the charger terminals, and a retracted position, which is attained when the battery pack is attached to the connecting portion, in which the cover is at least partially retracted inside the housing; and
a guide means provided in the connecting portion for allowing the battery pack to be slid along a predetermined guide locus into attachment to the connecting portion.

19. A charger in accordance with claim 18, further comprising
biasing means for urging the protective cover to the protruding position when the battery pack is not attached to the connecting portion, wherein the battery pack is brought into contact with and rotates the protective cover to the retracted position against the biasing force of the biasing means when the pack is slid along the guide locus.

\* \* \* \* \*

UNITED STATES PATENT AND TRADEMARK OFFICE
CERTIFICATE OF CORRECTION

PATENT NO. : 6,346,793 B1
DATED : February 12, 2002
INVENTOR(S) : Shibata et al.

It is certified that error appears in the above-identified patent and that said Letters Patent is hereby corrected as shown below:

Column 4,
Line 56, replace: "FIG.1 11A" with -- FIG. 11A --.

Signed and Sealed this

Twenty-third Day of July, 2002

JAMES E. ROGAN
Director of the United States Patent and Trademark Office